US012565628B2

(12) United States Patent
Hulskotter et al.

(10) Patent No.: US 12,565,628 B2
(45) Date of Patent: Mar. 3, 2026

(54) FABRIC AND HOME CARE PRODUCT COMPRISING A SULFATIZED ESTERAMINE

(71) Applicant: The Procter & Gamble Company, Cincinnati, OH (US)

(72) Inventors: Frank Hulskotter, Ludwigshafen (DE); Gang Si, Newcastle upon Tyne (GB); Katarzyna Gorczynska-Costello, Newcastle upon Tyne (GB); Jean-Pol Boutique, Gembloux (BE); Pieter Jan Maria Saveyn, Destelbergen (BE); Natalia Stergiopoulou, Brussels (BE); Jef Annie Alfons Maes, Sint-Niklaas (BE); Sophia Rosa Ebert, Mannheim (DE); Ouidad Benlahmar, Mannheim (DE); Dawid Marczewski, Limburgerhof (DE); Dieter Hannu Boeckh, Limburgerhof (DE); Christine Mendera, Dannstadt-Schauernheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 512 days.

(21) Appl. No.: 18/149,187

(22) Filed: Jan. 3, 2023

(65) Prior Publication Data

US 2023/0250365 A1 Aug. 10, 2023

Related U.S. Application Data

(63) Continuation of application No. PCT/US2021/040220, filed on Jul. 2, 2021.

(30) Foreign Application Priority Data

Jul. 3, 2020 (EP) .................................... 20184017

(51) Int. Cl.
*C11D 3/30* (2006.01)
*C11D 3/34* (2006.01)

(52) U.S. Cl.
CPC ........... *C11D 3/349* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 10,640,736 | B2 * | 5/2020 | Scialla | C07C 229/08 |
| 10,745,649 | B2 * | 8/2020 | Scialla | C11D 3/30 |
| 2013/0225859 | A1 * | 8/2013 | Allen | C07C 69/533<br>560/205 |
| 2022/0144753 | A1 * | 5/2022 | Ebert | C07C 303/24 |
| 2022/0389143 | A1 * | 12/2022 | Mueller | C11D 3/3753 |
| 2022/0403107 | A1 * | 12/2022 | Ebert | C08G 65/2624 |
| 2023/0357138 | A1 * | 11/2023 | Ebert | C07C 309/10 |

FOREIGN PATENT DOCUMENTS

| | | | |
|---|---|---|---|
| EP | 0032837 | A1 | 7/1981 |
| WO | 2005092952 | A1 | 10/2005 |
| WO | 2012061093 | A1 | 5/2012 |
| WO | 2019010367 | A1 | 1/2019 |
| WO | 2019010368 | A1 | 1/2019 |

OTHER PUBLICATIONS

PCT Search Report and Written Opinion for PCT/US2021/040220 dated Sep. 29, 2021, 13 pages.
Extended EP Search Report and Written Opinion for 20184017.0 dated Dec. 2, 2020, 08 pages.

* cited by examiner

*Primary Examiner* — Lorna M Douyon
(74) *Attorney, Agent, or Firm* — Abigail O. Idokogi

(57) ABSTRACT

Fabric and home care products including sulfatized esteramines obtainable by a process comprising step a), wherein at least one alcohol containing at least two hydroxy groups (compound (A)) is reacted with at least one lactam (compound (B)) and with sulfuric acid (compound (C)).

5 Claims, No Drawings

FABRIC AND HOME CARE PRODUCT COMPRISING A SULFATIZED ESTERAMINE

FIELD OF THE INVENTION

The present application relates to fabric and home care products comprising sulfatized esteramines. The fabric and home care products show good soil dispersing properties, and/or improved whiteness performance, and/or improved suds profile.

BACKGROUND OF THE INVENTION

The present application relates to fabric and home care products comprising sulfatized esteramines obtainable by a process comprising step a), wherein at least one alcohol containing at least two hydroxy groups (compound (A)) is reacted with at least one lactam (compound (B)) and with sulfuric acid (compound (C)). The present application also relates to a process for preparing such sulfatized esteramines.

WO 2019/007750 relates to alkoxylated esteramines and salts thereof according to a specific formula (I). In case the respective compound is a salt, the respective salt may be obtained by at least partial protonation of the amine groups contained within the compounds according to formula (I) by an acid selected from compounds such as methane sulfonic acid, hydrochloric acid, sulfuric acid, phosphoric acid or lactic acid. The alkoxylated esteramines of WO 2019/007750 may be obtained by reacting at least one alcohol according to a specific formula (III) with at least one $C_2$ to $C_{16}$ alkylene oxide followed by at least partial esterification with at least one aminoacid such as alanine, lysine or an acid according a specific formula (IV). Further alkoxylated esteramines and salts thereof are disclosed within WO 2019/007754.

WO 2019/110371 relates to a process for the preparation of organic sulfonic salts of aminoacid esters as well as to the organic sulfonic acid salts of aminoacid esters as such. The respective organic sulfonic acid salts of aminoacid esters are obtained by a process comprising the reaction of at least one lactam having at least three carbon atoms in the lactam ring with at least one organic sulfonic acid in aqueous solution (step i)) and the esterification of the reaction product of step i) with at least one alcohol with at least 8 carbon atoms comprising at least one hydroxyl group.

European application 19150654.2 relates to a process for the preparation of organosulfate salts of aminoacid esters within the respective process. At least one lactam with at least 3 carbon atoms in the lactam ring is reacted with sulfuric acid within the first step and an esterification of the reaction product of the first step with at least 200 mol % of at least one alcohol containing only one hydroxy group is carried out in a second step.

The sulfatized esteramines according to the present invention may be used in fabric and home care products, such as laundry detergents and dishwashing detergents.

An advantage can be seen in the fact that the sulfatized esteramines according to the present invention show improved clay dispersing properties and/or an improved whiteness and/or improved suds mileage compared to esteramines based on, for example, alkoxylated and non-alkoxylated di- and polyols without sulfate groups. This means, expressed in other words, that the respective esteramines according to the prior art do not mandatorily contain any $OSO_3$ fragments.

The object is achieved by a sulfatized esteramine obtainable by a process comprising step a):

a) reacting at least one alcohol containing at least two hydroxy groups (compound (A)) with at least one lactam (compound (B)) and with sulfuric acid (compound (C)).

SUMMARY OF THE INVENTION

The present application provides a fabric and home care product comprising a sulfatized esteramine obtainable by a process comprising step a):

a) reacting at least one alcohol containing at least two hydroxy groups (compound (A)) with at least one lactam (compound (B)) and with sulfuric acid (compound (C)).

DETAILED DESCRIPTION OF THE INVENTION

The application relates to a fabric and home care product comprising a sulfatized esteramine obtainable by a process comprising step a):

a) reacting at least one alcohol containing at least two hydroxy groups (compound (A)) with at least one lactam (compound (B)) and with sulfuric acid (compound (C)).

Generally, as used herein, the term "obtainable by" means that corresponding products do not necessarily have to be produced (i.e. obtained) by the corresponding method or process described in the respective specific context, but also products are comprised which exhibit all features of a product produced (obtained) by said corresponding method or process, wherein said products were actually not produced (obtained) by such method or process. However, the term "obtainable by" also comprises the more limiting term "obtained by", i.e. products which were actually produced (obtained) by a method or process described in the respective specific context.

When used herein any definition requiring a compound or a substituent of a compound to consist of "at least a number of carbon atoms", number of carbon atoms refers to the total number of carbon atoms in said compound or substituent of a compound. For example for a substituent disclosed as "alkyl ether with at least 8 carbon atoms comprising alkylene oxide groups", the total number of at least 8 carbon atoms needs to be the sum of the number of carbon atoms of the alkyl moiety and the number of carbon atoms of the alkylene oxide moieties.

The term "containing at least two hydroxy groups" means that two or more —OH groups are present. The term "hydroxy group" is equal to the term "hydroxyl group" or "—OH group". Alcohols/compounds having only one hydroxy group, such as methanol or ethanol, do, by consequence, not fall under the definition of an alcohol containing at least two hydroxy groups according to compound (A) of the present invention. Any functionalized group derived from a hydroxy group such as an ether group is not considered to be an —OH group.

Alcohols containing at least two hydroxy groups according to compound (A) are known to a person skilled in the art. As mentioned above, the respective alcohol may contain two, three, four, five or even more hydroxy groups within the respective molecule/compound. The respective alcohol may contain linear, branched and/or cyclic alkyl fragments. Beyond that, the respective alcohol may also contain aromatic fragments as well as combinations of alkyl and aromatic fragments ("aralkyl fragments"). Furthermore, the respective alcohol may also contain alkyl ether fragments. Examples of alcohols according to compound (A) are glycerol, pentaerythrite, sorbitol, 1,1,1-trimethylolpropane (TMP) or alkoxylated alcohols, such as polyethylene glycol. Alcohols according to compound (A) of the present invention are usually commercially available, for example, under the tradename "Pluronics" (for example as polyethyleneglycol block (co)polymers) from BASF SE.

In one embodiment, at least one linear or branched $C_2$- to $C_{36}$-alcohol containing at least two hydroxy groups is used.

In another embodiment, alkylether alcohols are used. Alkylether alcohols are for example alkyl alcohols alkoxylated with ethylene oxide, and/or propylene oxide, and/or butylene oxide. In one embodiment, at least one linear or branched $C_2$- to $C_{36}$-alcohol containing at least two hydroxy groups alkoxylated with ethylene oxide, and/or propylene oxide, and/or butylene oxide is used. In another embodiment at least one $C_8$- to $C_{22}$-alcohol containing at least two hydroxy groups alkoxylated with ethylene oxide, and/or propylene oxide, and/or butylene oxide is used.

Alkoxylation of the alcohol is either carried out with only one alkylene oxide or with more than one alkylene oxide. If more than one alkylene oxide is used, the resulting alkylether alcohols comprises either randomly distributed alkylene oxide units or a block of one alkylene oxide followed by a block of another alkylene oxide. In one embodiment, alkyl alcohols alkoxylated with only a single alkylene oxide are used. In a further embodiment, alkyl alcohols alkoxylated with a first alkylene oxide followed by alkoxylation with a second alkylene oxide, thereby forming a block structure of different alkylene oxide blocks, are used.

The at least one alcohol containing at least two hydroxy groups according to compound (A) is preferably at least one alcohol containing at least two hydroxy groups selected from diols, polyols, alkoxylated diols and alkoxylated polyols, more preferably, selected from sorbitol, 1,6-hexanediol, glycerol, 1,1,1-trimethylolpropan (TMP), pentaerythrite, polyethyleneglycol, ethylene glycol, alkoxylated ethylene glycol, propylene glycol, alkoxylated propylene glycol, polypropylene glycol, alkoxylated sorbitol, alkoxylated 1,6-hexanediol, alkoxylated glycerol, alkoxylated TMP and alkoxylated pentaerythrite, most preferably, selected from 1,6-hexanediol, alkoxylated sorbitol, alkoxylated glycerol, polyethylene glycol, alkoxylated TMP and alkoxylated pentaerythrite.

Within the context of the present application, it is also preferred that in case compound (A) comprises an alkoxylated alcohol containing at least two hydroxy groups, the alkoxylated fragment of the respective alcohol is based on at least one $C_2$-$C_{22}$ alkylene oxide, more preferably on ethylene oxide and/or propylene oxide, most preferably the respective alcohol comprises at least one block based on ethylene oxide and/or propylene oxide.

Within the context of the present application, it is also preferred that in case an alkoxylated alcohol containing at least two hydroxy groups is employed as compound (A), the respective alkoxylation in order to obtain the respective alkoxylated alcohol is carried out prior to step a) as a separate step b). Expressed in other words, this means that first an alkoxylated alcohol according to compound (A) is prepared and, for example, directly afterwards, the respective alkoxylated alcohol is employed within step a) of the process according to the present invention in order to obtain the sulfatized ester amines according to the present invention.

It is therefore preferred that the sulfatized ester amines according to the present invention are obtainable by a process comprising steps a) and b), wherein step a) is defined as above and the process also comprises step b), which is carried out prior to step a):

b) at least one alcohol containing at least two hydroxy groups and having a molecular weight $M_W$ of less than 500 g/mol is reacted with at least one alkylene oxide in order to obtain an alkoxylated alcohol as compound (A).

Within step b), it is even more preferred that the sulfatized esteramine according to the present invention is obtained, wherein i) ethylene oxide and/or propylene oxide is employed, and/or ii) at least one alcohol containing at least two hydroxy groups and having a molecular weight $M_W$ of less than 500 g/mol is reacted with at least 1 mol of propylene oxide and/or with at least 1 mol of ethylene oxide, and/or iii) at least one alcohol containing at least two hydroxy groups and having a molecular weight $M_W$ of less than 500 g/mol is reacted batchwise with ethylene oxide and/or propylene oxide in order to obtain at least one block based on ethylene oxide and/or propylene oxide on the respective alkoxylated alcohol, and/or iv) at least one alcohol containing at least two hydroxy groups and having a molecular weight $M_W$ of less than 500 g/mol is reacted in at least one batch with 1 to 120 mol of propylene oxide followed by at least one batch of 1 to 150 mol ethylene oxide.

The at least one lactam according to compound (B) is known to a person skilled in the art. In principle, any lactam which is stable and known to a person skilled in the art can be employed as compound (B) within the context of the present invention.

Lactams are cyclic amides, starting with α-lactam (three ring atoms) followed by β-lactam (four ring atoms), γ-lactam (five ring atoms) and so on. When hydrolyzed, lactams form the corresponding α-, β-, γ-amino acid. All lactams with at least three carbon atoms in the lactam ring can be used in the process for the synthesis of sulfatized esteramines according to the present invention. In one embodiment of the present invention, lactams with of from four to twelve carbon atoms in the lactam ring are used. In another embodiment of the present invention, lactams with of from five to seven carbon atoms in the lactam ring are used. In a further embodiment, a lactam with six carbon atoms in the lactam ring, ε-lactam, is used.

Reaction of the lactam ring may take place by reacting the at least one lactam with sulfuric acid. Reaction of the lactam ring with the sulfuric acid is preferably carried out in an aqueous solution. In one embodiment of the present application the reaction of the lactam ring takes place by reacting the at least one lactam with sulfuric acid in an aqueous solution containing only water.

The term "free of water" means that the composition contains no more than 5 wt.-% of water based on the total amount of solvent, in another embodiment no more than 1 wt.-% of water based on the total amount of solvent, in a further embodiment the solvent contains no water at all.

The term "aqueous solution" means that the solvent contains more than 50 wt.-% of water based on the total amount of solvent. In a further embodiment the term means that the solvent contains more than 80 wt.-% of water based on the total amount of solvent. In another embodiment the term means that the solvent contains more than 95 wt.-% of water based on the total amount of solvent. In a further embodiment the term means that the solvent contains more than 99 wt.-% of water based on the total amount of solvent. In an even further embodiment, the term means that the solvent contains only water.

Within the present invention, it is preferred that compound (B) is at least one ε-lactam, most preferably caprolactam.

Sulfuric acid as such, which is employed as compound (C) within the present invention, is known to a person skilled in the art.

In one embodiment of the present invention, the lactam is selected from the group consisting of a lactam with five carbon atoms in the lactam ring, and a lactam with six carbon atoms in the lactam ring, and the reaction with sulfuric acid is carried out in an aqueous solution. In another embodiment of the present invention, the lactam has five carbon atoms in the lactam ring and the reaction with sulfuric acid is carried out in an aqueous solution.

In one embodiment the lactam is either dissolved in water or is dispersed in an aqueous phase. Typical concentration of lactam in water is in the range of from 50% by weight to 99% by weight based on the total weight of lactam and water. In one embodiment of the present invention the concentration of lactam in water is in the range of from 55 to 90% by weight based on the total weight of the lactam and water. In a further embodiment the concentration of lactam in water is in the range of from 65 to 80% by weight based on the total weight of the lactam and water.

In one embodiment, sulfuric acid is used as concentrated sulfuric acid. In another embodiment, sulfuric acid is used as 96 to 98 wt.-% sulfuric acid solution in water. In a further embodiment sulfuric acid is used as 80 wt.-% sulfuric acid solution in water.

In one embodiment the total amount of sulfuric acid is added at the beginning of the reaction to the at least one lactam. In another embodiment the sulfuric acid is added dropwise for a duration of from 0.1 to 10 h to the at least one lactam.

The process as such comprising step a) in order to obtain the sulfatized esteramines according to the present invention can be carried out by any method known to a person skilled in the art. Specific ways/embodiments for carrying out step a) according to the present invention, are described in further detail below within the experimental section.

Step a) according to the present invention may be carried out by mixing the respective compounds (A) to (C) in any order and/or sequence. For example, it is possible to mix all three components together before starting the reaction as such. However, it is also possible to mix only parts of these components in advance and the remaining parts of the respective components or even the complete part of a single component afterwards. For example, step a) can also be carried out batchwise and/or continuously.

Within the context of the present invention, it is preferred that in step a)

i) at least a fraction of compound (A) is first mixed with at least a fraction of compound (B) followed by continuously adding at least a fraction of compound (C) over a specific period of time, preferably the entire amount of compound (A) is first mixed with the entire amount of compound (B) followed by continuously adding the entire amount of compound (C), and/or ii) compound (C) is added for a specific period of time and the specific period of time for continuously adding compound (C) is preferably in the range of less than one hour, more preferably less than 30 minutes, most preferably between 5 and 15 minutes, and or iii) the reaction is carried out after all compounds (A) to (C) are admixed with each other at a temperature of 80 to 200° C. and/or water is removed from the reaction mixture.

The specific ratio of the individual compounds (A) to (C) can, in principle, be freely chosen. However, it is preferred that at least one of the following conditions, preferably all of the following conditions, is fulfilled when carrying out step a) according to the present invention.

It is preferred within the context of the present invention that in step a) the molar ratio of compound (C) to compound (B) is at least 100 mol %, preferably in the range of 100 mol % to 125 mol %.

It is preferred within the context of the present invention that in step a) the molar ratio of compound (B) to the hydroxy groups of compound (A) is in the range of 10 mol % to 50 mol %.

It is preferred within the context of the present invention that in step a) the molar ratio of compound (C) to the hydroxy groups of compound (A) is in the range of 10 mol % to 62.5 mol %.

Within the context of the present invention, it is even more preferred that in step a) at least 10% of all hydroxy groups of compound (A) are reacted with compound (B) in order to form ester groups within the respective sulfatized esteramine and/or at least 10% of all hydroxy groups of compound (A) are sulfatized in order to form $OSO_3$ fragments within the respective sulfatized esteramine.

It is even more preferred that in step a):

20 to 50% of all hydroxy groups of compound (A) are reacted with compound (B) in order to form ester groups within the respective sulfatized esteramine;

20 to 50% of all hydroxy groups of compound (A) are sulfatized in order to form $OSO_3$ fragments within the respective sulfatized esteramine; and 0 to 30% of all hydroxy groups of compound (A) remain in unreacted form within the respective sulfatized esteramine.

As already mentioned above, it is also possible that besides compounds (A) to (C), further compounds such as solvent and/or water are present when carrying out step a). In addition, it is also possible that prior to and/or after step a), further steps may be carried out in order to obtain the sulfatized esteramines according to the present invention.

In one embodiment of the present invention, step a) is carried out in the presence of at least one solvent and/or in the presence of water. It is preferred that step a) is carried out in the presence of water, preferably by employing an aqueous solution of compound (B).

It is also preferred that in case a solvent and/or water is employed and/or in order to remove an excess of unreacted educts that an additional step (C) is carried out after step a) is finished. However, it is also possible that step c) is already started in parallel to performing step a) or at the end of performing step a).

In one embodiment of the present invention, it is preferred that an optional step c) is carried out by removing water and/or by removing excess alcohol according to compound (A), preferably step c) is carried out after step a) is finished.

By consequence, within step c) of the present invention, water and/or excess alcohol can be removed. Removal of water and alcohol can be carried out by all techniques known in the art, for example by application of a vacuum. In one embodiment of the present invention step c), the optional removal of water and/or excess of alcohol, is carried out applying a vacuum in the range of from 0.1 mbar to 800 mbar. In another embodiment vacuum in the range of from 1 mbar to 500 mbar is applied. In a further embodiment vacuum in the range of from 10 mbar to 100 mbar is applied.

Within the context of the present invention, it is preferred that step a) is carried out by i) the reaction is carried out after all compounds (A) to (C) are admixed with each other at a temperature of 80 to 200° C. for a period of time of 1 to 30 hours, and/or ii) the reaction is carried out in a closed vessel under pressure from 1.0 up to 10 bar, preferably 1.0 to 5 bar, most preferably 1.0 to 4 bar.

In another embodiment of the present invention, step a) is carried out by a process comprising steps i) to iii):

(i) reacting at least one lactam with at least 3 carbon atoms in the lactam ring with sulfuric acid;

(ii) esterification of the reaction product of step (i) with 10-50 mol % of the hydroxy groups of an alcohol containing at least two hydroxy groups:

(iii) optionally removal of water and/or removal of excess alcohol of step (ii).

Within this embodiment of the present invention, step a) is carried out in accordance with the specific sequence of steps as disclosed within EP application 19150654.2 (in respect of steps i) to iii)). Moreover, this embodiment of the present invention differs from the respective disclosure of EP application 19150654.2 in the definition of the alcohol, which is within the context of the present invention an alcohol according to component (A) as defined above, whereas in EP application 19150654.2 an alcohol mandatorily containing only one hydroxyl group is employed in the respective process.

In another embodiment, the present invention relates to sulfatized esteramines of Formula (I) and salts thereof, (Formula I)

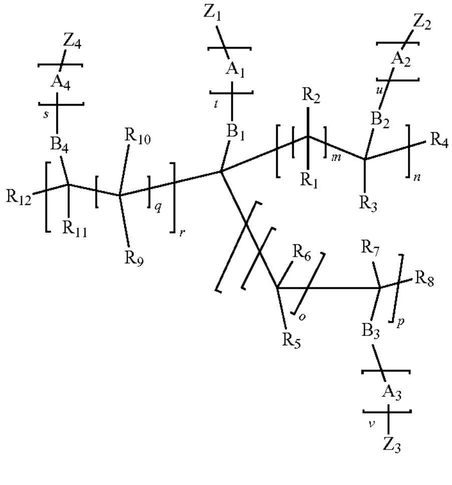

wherein independently from each other n being an integer from 1 to 12;

m being an integer for each repetition unit n independently selected from 0 to 12;

p being an integer from 0 to 12, being an integer for each repetition unit p independently selected from 0 to 12;

r being an integer from 0 to 12, q being an integer for each repetition unit r independently selected from 0 to 12;

s, t, u and v being an integer from 0 to 100;

$A_1$, $A_2$, $A_3$, and $A_4$ are independently from each other and independently for each repetition unit s, t, u, or v, selected from the list consisting of alkyleneoxy group, such A-units stem from the reaction of one alcohol with at least two hydroxy groups with $C_2$-$C_{22}$ alkylene oxides, e.g. in case of ethoxylated alcohols with at least two hydroxy groups A is "—O—$CH_2$—$CH_2$—", wherein for s, t, u, and/or v equal to 1 the oxygen atom of the $A_1$, $A_2$, $A_3$, and $A_4$ group is bound to the B group and the following $A_1$, $A_2$, $A_3$, and $A_4$ groups are always bound via the oxygen atom to the previous $A_1$, $A_2$, $A_3$, and $A_4$ group, $B_1$, $B_2$, $B_3$, and $B_4$ are independently from each other selected from the group consisting of a bond, linear $C_1$ to $C_{12}$ alkanediyl groups, and branched $C_1$ to $C_{12}$ alkanediyl groups, such B-units are given by the molecular structure of one alcohol with at least two hydroxy groups, e.g. in case of example 6 (ethoxylated glycerol, esterified with 1 mol caprolactam and esterified with 1 mole sulfuric acid) B1, B2 and B4 are "-", with p=0, r=1, n=1, m=0, q=0, t=4, u=4, s=4; R3 R4, R8, R11, and R12=H; Z1, Z2 and Z4=OSO3H, OH or Formula (II) with w=3, and R13, R14 R15, R16, R17, and R18=H, $R_1$, $R_2$, $R_3$ $R_4$, $R_5$, $R_6$, $R_7$, $R_8$, $R_9$, $R_{10}$, $R_{11}$ and $R_{12}$ being independently for each repetition unit selected from the group consisting of H, linear alkyl, branched alkyl, and cycloalkyl; such R-units are given by the molecular structure of one alcohol with at least two hydroxy groups, $Z_1$, and/or $Z_2$, and/or $Z_3$, and/or $Z_4$, independently for each repetition unit n, p, and r, are selected from the group consisting of OH, and $OSO_3^-$, and —$OSO_3H$ and a compound according to Formula (II), wherein said compound according to Formula (II) connects to the compound according to Formula (I) via the bond labeled with *, such Z-units stem from the reaction of one alcohol with at least two hydroxy groups with at least one lactam and with sulfuric acid, e.g. in case of reaction with C4 lactam and sulfuric acid, $Z_1$, $Z_2$, $Z_3$, $Z_4$, are "—OC(O)—$CH_2$—$CH_2$—$CH_2$—$NH_2$ or $SO_3H$ or OH, with the provision that at least 10 mol % to 50 mol % of the substituents $Z_1$, and/or $Z_2$, and/or $Z_3$, and/or $Z_4$, are a compound according to Formula (II), and at least 10 mol % to 50 mol % of the substituents $Z_1$, and/or $Z_2$, and/or $Z_3$, and/or $Z_4$, are a group consisting $OSO_3^-$, or —$OSO_3H$, and 0 mol % to 80 mol % of the substituents $Z_1$, and/or $Z_2$, and/or $Z_3$, and/or $Z_4$, are OH, (Formula II)

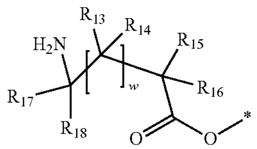

with independently from each other w being an integer from 0 to 12, $R_{13}$, $R_{14}$ $R_{15}$, $R_{16}$, $R_{17}$, and $R_{18}$ independently being selected from the group consisting of H, linear alkyl, branched alkyl, and cycloalkyl; such R-units stem from the lactam, e.g. in case of reaction with C4 lactam $R_{13}$, $R_{14}$ $R_{15}$, $R_{16}$, $R_{17}$, and $R_{18}$ are=H, w=1, and then Formula (II) is "—OC(O)—$CH_2$—$CH_2$—$CH_2$—$NH_2$".

The sulfatized esteramines according to the above defined formula (I) or the respective salts thereof are obtained by the process as described above. The definition of the sulfatized esteramines according to formula (I) is a result of an optimized way for carrying out the respective process, wherein all functional groups (of the respective monomers or any intermediate) have undergone a complete reaction. A complete reaction (the conversion degree of 100%) is an idealized assumption. In reality, the degree of conversion is usually below 100%. Unreacted hydroxy groups may be present. This fact is known to a person skilled in the art due to the complexity of the reaction as well as the structure according to formula (I). Irrespective of that, the reaction for obtaining said structure is disclosed in the description above. By following the general reaction conditions as well as knowing specific reaction conditions, the real structure for each individual case/reaction condition is obvious for a person skilled in the art.

Another subject of the present invention is also the process as such for producing these sulfatized esteramines as described above, wherein the process comprises step a):

a) reacting at least one alcohol containing at least two hydroxy groups (compound (A)) with at least one lactam (compound (B)) and with sulfuric acid (compound (C)).

It is obvious for a person skilled in the art that the process as such can be carried out analogously as described above for the first subject matter of the present invention, the sulfatized esteramines as such obtainable by a process comprising step a) including all variations and/or embodiments and/or preferred definitions.

The inventive compounds can also be added to (used in) fabric and home care products, such as washing or compositions.

The inventive sulfatized esteramines are present in said products at a concentration of 0.1 to 5 weight %, preferably at a concentration of 0.5 to 2 weight %.

The inventive sulfatized esteramines can also be added to a product comprising from about 1% to about 70% by weight of a surfactant system. The inventive sulfatized esteramines may be present in a fabric and home care product at a concentration of from about 0.1% to about 5% by weight of the product, or at a concentration of from about 0.5% to about 2% by weight of the product.

The fabric and home care product can be a laundry detergent composition or a dish-washing detergent composition. Suitable compositions are described in more detail below.

Laundry Detergent Composition: Suitable laundry detergent compositions include laundry detergent powder compositions, laundry detergent liquid compositions, laundry detergent gel compositions, and water-soluble laundry detergent compositions.

Dish-washing Detergent Composition: Suitable dish-washing detergent compositions include hand dish-washing detergent compositions and automatic dish-washing detergent compositions.

Surfactant System: The compositions comprise a surfactant system in an amount sufficient to provide desired cleaning properties. In some embodiments, the composition comprises, by weight of the composition, from about 1% to about 70% of a surfactant system. In other embodiments, the liquid composition comprises, by weight of the composition, from about 2% to about 60% of the surfactant system. In further embodiments, the composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants: In some examples, the surfactant system of the composition may comprise from about 1% to about 70%, by weight of the surfactant system, of one or more anionic surfactants. In other examples, the surfactant system of the composition may comprise from about 2% to about 60%, by weight of the surfactant system, of one or more anionic surfactants. In further examples, the surfactant system of the composition may comprise from about 5% to about 30%, by weight of the surfactant system, of one or more anionic surfactants. In further examples, the surfactant system may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines.

Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic Surfactants: The surfactant system of the composition may comprise a nonionic surfactant. In some examples, the surfactant system comprises up to about 25%, by weight of the surfactant system, of one or more nonionic surfactants, e.g., as a co-surfactant. In some examples, the compositions comprises from about 0.1% to about 15%, by weight of the surfactant system, of one or more nonionic surfactants. In further examples, the compositions comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: $C_5$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates ($BAE_x$), wherein x is from 1 to 30; alkylpolysaccharides; specifically alkylpolyglycosides; Polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Anionic/Nonionic Combinations: The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

Cationic Surfactants: The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions of the invention are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactants: Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylamino-1-propane sulfonate where the alkyl group can be $C_8$ to $C_{18}$ and in certain embodiments from $C_{10}$ to $C_{14}$.

Amphoteric Surfactants: Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-iminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Branched Surfactants: Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

Adjunct Cleaning Additives: The compositions of the invention may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds suppressors, softeners, and perfumes.

Enzymes: The compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a composition, the aforementioned additional enzymes may be present at levels from about 0.00001% to about 2%, from about 0.0001% to about 1% or even from about 0.001% to about 0.5% enzyme protein by weight of the composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii.*

(b) trypsin-type or chymotrypsin-type proteases, such as trypsin (e.g., of porcine or bovine origin), including the Fusarium protease and the chymotrypsin proteases derived from Cellumonas.

(c) metalloproteases, including those derived from *Bacillus amyloliquefaciens.*

Preferred proteases include those derived from *Bacillus gibsonii* or *Bacillus Lentus.*

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Enzyme Stabilizing System: The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders: The compositions of the present invention may optionally comprise a builder. Built compositions typically comprise at least about 1% builder, based on the total weight of the composition. Liquid compositions may comprise up to about 10% builder, and in some examples up to about 8% builder, of the total weight of the composition. Granular compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O) \cdot ySiO_2 \cdot zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners: Suitable structurant/thickeners include:

i. Di-benzylidene Polyol Acetal Derivative
ii. Bacterial Cellulose
iii. Coated Bacterial Cellulose
iv. Cellulose fibers non-bacterial cellulose derived
v. Non-Polymeric Crystalline Hydroxyl-Functional Materials
vi. Polymeric Structuring Agents
vii. Di-amido-gellants
viii. Any combination of above.

Polymeric Dispersing Agents: The composition may comprise one or more polymeric dispersing agents. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers such as the compound having the following general structure: $bis((C_2H_5O)(C_2H_4O)n)(CH_3)—N^+—C_xH_{2x}—N^+—(CH_3)-bis((C_2H_5O)(C_2H_4O)n)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkyleneimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyleneimines can be alkoxylated to various degrees. A useful example is 600 g/mol polyethyleneimine core ethoxylated to 20 EO groups per NH and is available from BASF.

The composition may comprise random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The composition of the present invention may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil Release Polymer: The compositions described herein may include from about 0.01% to about 10.0%, typically from about 0.1% to about 5%, in some aspects from about 0.2% to about 3.0%, by weight of the composition, of a soil release polymer (also known as a polymeric soil release agents or "SRA").

Soil release polymers typically have hydrophilic segments to hydrophilize the surface of hydrophobic fibers (such as polyester and nylon), and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

The structure and charge distribution of the soil release polymer may be tailored for application to different fibers or textile types and for formulation in different detergent or detergent additive products. Soil release polymers may be linear, branched, or star-shaped.

Soil release polymers may also include a variety of charged units (e.g., anionic or cationic units) and/or non-charged (e.g., nonionic) monomer units. Typically, a nonionic SRP may be particularly preferred when the SRP is used in combination with a cationic fabric conditioning active, such as a quaternary ammonium ester compound, in order to avoid potentially negative interactions between the SRP and the cationic active.

Soil release polymer may include an end capping moiety, which is especially effective in controlling the molecular weight of the polymer or altering the physical or surface-active properties of the polymer.

One preferred class of suitable soil release polymers include terephthalate-derived polyester polymers, which comprise structure unit (I) and/or (II):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

wherein:

a, b are from 1 to 200;

d, e are from 1 to 50;

Ar is a 1,4-substituted phenylene;

sAr is 1,3-substituted phenylene substituted in position 5 with $SO_3M$;

M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$ are independently selected from H or $C_1$-$C_{18}$ n-alkyl or iso-alkyl;

Optionally, the polymer further comprises one or more terminal group (III) derived from polyalkylene glycolmonoalkylethers, preferably selected from structure (IV-a)

$$—O—[C_2H_4—O]_c—[C_3H_6—O]_d—[C_4H_8—O]_e—R_7 \quad (IV\text{-}a)$$

wherein:

$R_7$ is a linear or branched $C_{1\text{-}30}$ alkyl, $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; preferably $C_{1\text{-}4}$ alkyl, more preferably methyl; and c, d and e are, based on molar average, a number independently selected from 0 to 200, where the sum of c+d+e is from 2 to 500, wherein the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, either of the $[C_2H_4—O]$, $[C_3H_6—O]$ and $[C_4H_8—O]$ groups of the terminal group (IV-a) can be linked to $—R_7$ and/or —O.

Optionally, the polymer further comprises one or more anionic terminal unit (IV) and/or (V) as described in EP3222647. Where M is a counterion selected from Na, Li, K, Mg/2, Ca/2, Al/3, ammonium, mono-, di-, tri-, or tetraalkylammonium wherein the alkyl groups are C1-C18 alkyl or C2-C10 hydroxyalkyl, or mixtures thereof.

$$—O—CH_2CH_2—SO_3M \quad (IV)$$

(V)

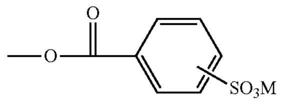

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, the polymer may comprise other di- or polycarboxylic acids or their salts or their (di)alkylesters can be used in the polyesters of the invention, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their $(C_1$-$C_4)$-(di)alkyl esters and more preferably their (di)methyl esters, or mixtures thereof.

Preferably, suitable terephthalate-derived soil release polymers are nonionic, which does not comprise above structure (II). A further particular preferred nonionic terephthalate-derived soil release polymer has a structure according to formula below:

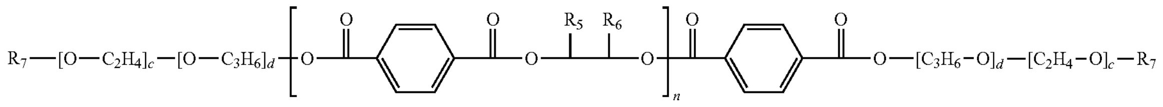

wherein:

$R_5$ and $R_6$ is independently selected from H or $CH_3$. More preferably, one of the $R_5$ and $R_6$ is H, and another is $CH_3$.

c, d are, based on molar average, a number independently selected from 0 to 200, where the sum of c+d is from 2 to 400, More preferably, d is from 0 to 50, c is from 1 to 200, More preferably, d is 1 to 10, c is 5 to 150, $R_7$ is $C_{1\text{-}4}$ alkyl and more preferably methyl, n is, based on molar average, from 1 to 50.

One example of most preferred above suitable terephthalate-derived soil release polymers has one of the $R_5$ and $R_6$ is H, and another is $CH_3$; d is 0; c is from 5-100 and $R_7$ is methyl.

Suitable terephthalate-derived soil release polymers may be also described as sulphonated and unsulphonated PET/POET (polyethylene terephthalate/polyoxyethylene terephthalate) polymers, both end-capped and non-end-capped. Example of suitable soil release polymers include TexCare® polymers, including TexCare® SRA-100, SRA-300, SRN-100, SRN-170, SRN-240, SRN-260, SRN-300, and SRN-325, supplied by Clariant.

Other suitable terephthalate-derived soil release polymers are described in patent WO2014019903, WO2014019658 and WO2014019659.

Another class of soil release polymer also include modified cellulose. Suitable modified cellulose may include nonionic modified cellulose derivatives such as cellulose alkyl ether and cellulose hydroxyalkyl ethers. Example of such cellulose alkyl ether and cellulose hydroxyalkyl ethers include methyl cellulose, ethyl cellulose, hydroxyethyl cellulose, hydroxypropyl cellulose, hydroxypropyl methylcellulose, hydroxybutyl methyl cellulose. In some embodiment, the modified cellulose may comprise hydrocarbon of $C_4$ or above, preferred length of the alkyl group maybe $C_4$, $C_6$, $C_8$, $C_{10}$, $C_{12}$, $C_{14}$, $C_{16}$, $C_{18}$; example of suitable modified cellulose are described in WO2019111948 and WO2019111949. In some embodiment, the modified cellulose may comprise additional cationic modification, example of suitable modified cellulose with additional cationic modification are described in WO2019111946 and WO2019111947.

Other examples of commercial soil release polymers are the REPEL-O-TEX® line of polymers supplied by Rhodia, including REPEL-O-TEX® SF, SF-2, and SRP6. Other suitable soil release polymers are Marloquest® polymers, such as Marloquest® SL, HSCB, L235M, B, and G82, supplied by Sasol. Further suitable soil release polymers of a different type include the commercially available material ZELCON 5126 (from DuPont) and MILEASE T (from ICI), Sorez 100 (from ISP).

Cellulosic Polymer: The compositions described herein may include from about 0.1% to about 10%, typically from about 0.5% to about 7%, in some aspects from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix® V (sold by CP Kelko).

Additional Amines: Additional amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

For example, alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyleneimines can be alkoxylated to various degrees. A useful example is 600 g/mol polyethyleneimine core ethoxylated to 20 EO groups per NH and is available from BASF. The compositions described herein may comprise from about 0.1% to about 10%, and in some examples, from about 0.1% to about 8%, and in other examples, from about 0.1% to about 6%, by weight of the composition, of alkoxylated polyamines.

Alkoxylated polycarboxylates may also be used in the compositions herein to provide grease removal. Chemically, these materials comprise polyacrylates having one ethoxy side-chain per every 7-8 acrylate units. The side-chains are of the formula $-(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but may be in the range of about 2000 to about 50,000. The compositions described herein may comprise from about 0.1% to about 10%, and in some examples, from about 0.25% to about 5%, and in other examples, from about 0.3% to about 2%, by weight of the composition, of alkoxylated polycarboxylates.

Bleaching Compounds, Bleaching Agents, Bleach Activators, and Bleach Catalysts: The compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the compositions described herein will typically contain from about 0.025% to about 1.25%, by weight of the composition, of such bleaches, and in some examples, of sulfonate zinc phthalocyanine.

Brighteners: Optical brighteners or other brightening or whitening agents may be incorporated at levels of from about 0.01% to about 1.2%, by weight of the composition, into the compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis {[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulfonate (commercially available under the tradename Tinopal UNPA-GX by Ciba-Geigy Corporation), di sodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis {[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents: The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents: The compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents: The compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the composition.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Encapsulates: The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Fabric and home care products are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

The fabric and home care product typically comprises additional fabric and home care ingredients, such as those described in more detail above.

Liquid Laundry Detergent Composition. The fabric and home care product can be a laundry detergent composition, such as a liquid laundry detergent composition. Suitable liquid laundry detergent compositions can comprise a non-soap surfactant, wherein the non-soap surfactant comprises an anionic non-soap surfactant and a non-ionic surfactant. The laundry detergent composition can comprise from 10% to 60%, or from 20% to 55% by weight of the laundry detergent composition of the non-soap surfactant. The non-soap anionic surfactant to nonionic surfactant are from 1:1 to 20:1, from 1.5:1 to 17.5:1, from 2:1 to 15:1, or from 2.5:1 to 13:1. Suitable non-soap anionic surfactants include linear alkylbenzene sulphonate, alkyl sulphate or a mixture thereof. The weight ratio of linear alkylbenzene sulphonate to alkyl sulphate can be from 1:2 to 9:1, from 1:1 to 7:1, from 1:1 to 5:1, or from 1:1 to 4:1. Suitable linear alkylbenzene sulphonates are $C_{10}$-$C_{16}$ alkyl benzene sulfonic acids, or $C_{11}$-$C_{14}$ alkyl benzene sulfonic acids. Suitable alkyl sulphate anionic surfactants include alkoxylated alkyl sulphates, non-alkoxylated alkyl sulphates, and mixture thereof. Preferably, the HLAS surfactant comprises greater than 50% $C_{12}$, preferably greater than 60%, preferably greater than 70% $C_{12}$, more preferably greater than 75% $C_{12}$. Suitable alkoxylated alkyl sulphate anionic surfactants include ethoxylated alkyl sulphate anionic surfactants. Suitable alkyl sulphate anionic surfactants include ethoxylated alkyl sulphate anionic surfactant with a mol average degree of ethoxylation of from 1 to 5, from 1 to 3, or from 2 to 3. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, preferable from 14 to 18, or from 14 to 17, or from 14 to 16, or from 14 to 15 carbon atoms. The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. The alkyl fraction of the alkyl sulphate anionic surfactant can be derived from fatty alcohols, oxo-synthesized alcohols, Guerbet alcohols, or mixtures thereof. Preferred alkyl sulfates include optionally ethoxylated alcohol sulfates including 2-alkyl branched primary alcohol sulfates especially 2-branched $C_{12-15}$ primary alcohol sulfates, linear primary alcohol sulfates especially linear $C_{12-14}$ primary alcohol sulfates, and mixtures thereof. The laundry detergent composition can comprise from 10% to 50%, or from 15% to 45%, or from 20% to 40%, or from 30% to 40% by weight of the laundry detergent composition of the non-soap anionic surfactant.

Suitable non-ionic surfactants can be selected from alcohol broad or narrow range alkoxylates, an oxo-synthesised alcohol alkoxylate, Guerbet alcohol alkoxylates, alkyl phenol alcohol alkoxylates, or a mixture thereof. The laundry detergent composition can comprise from 0.01% to 10%, from 0.01% to 8%, from 0.1% to 6%, or from 0.15% to 5% by weight of the liquid laundry detergent composition of a non-ionic surfactant.

The laundry detergent composition comprises from 1.5% to 20%, or from 2% to 15%, or from 3% to 10%, or from 4% to 8% by weight of the laundry detergent composition of soap, such as a fatty acid salt. Such soaps can be amine neutralized, for instance using an alkanolamine such as monoethanolamine.

The laundry detergent composition can comprises an adjunct ingredient selected from the group comprising builders including citrate, enzymes, bleach, bleach catalyst, dye, hueing dye, Leuco dyes, brightener, cleaning polymers including alkoxylated polyamines and polyethyleneimines, amphiphilic copolymers, soil release polymer, surfactant, solvent, dye transfer inhibitors, chelant, diamines, perfume, encapsulated perfume, polycarboxylates, structurant, pH trimming agents, antioxidants, antibacterial, antimicrobial agents, preservatives and mixtures thereof.

The laundry detergent composition can have a pH of from 2 to 11, or from 6.5 to 8.9, or from 7 to 8, wherein the pH of the laundry detergent composition is measured at a 10% product concentration in demineralized water at 20° C.

The liquid laundry detergent composition can be Newtonian or non-Newtonian, preferably non-Newtonian.

For liquid laundry detergent compositions, the composition can comprise from 5% to 99%, or from 15% to 90%, or from 25% to 80% by weight of the liquid detergent composition of water.

The detergent composition according to the invention can be liquid laundry detergent composition. The following are exemplary liquid laundry detergent formulations. Preferably the liquid laundry detergent composition comprises from between 0.1% and 4.0%, preferably between 0.5% and 3%, more preferably between 1% to 2.5% by weight of the detergent composition of the sulfatized esteramine according to the invention.

TABLE 1

| Raw Material | Comp. 1 % wt | Comp. 2 % wt | Comp. 3 % wt | Comp. 4 % wt |
|---|---|---|---|---|
| Branched Alkyl Sulfate | 0.0 | 5.3 | 0.0 | 5.3 |
| Sodium Lauryl Sulfate | 0.0 | 3.0 | 0.0 | 3.0 |
| Linear alkylbenzene sulfonate | 18.0 | 5.0 | 6.0 | 5.0 |
| AE3S Ethoxylated alkyl sulphate with an average degree of ethoxylation of 3 | 5.0 | 0.0 | 1.3 | 0.0 |
| C25AES Ethoxylated alkyl sulphate with an average degree of ethoxylation of 2.5[1] | 0.0 | 3.0 | 1.4 | 0.0 |
| Amine oxide | 0.7 | 1.0 | 0.4 | 0.8 |
| C24 alkyl ethoxylate (EO7) | 8.4 | 0.0 | 12.9 | 5.0 |
| C24 alkyl ethoxylate (EO9) | 0.0 | 8.7 | 0.0 | 3.7 |
| C45 alkyl ethoxylate (EO7) | 0.0 | 2.7 | 0.0 | 2.7 |
| Citric acid | 2.9 | 2.3 | 0.7 | 2.3 |
| Palm kernel fatty acid | 0.0 | 1.0 | 0.0 | 1.0 |
| Topped kernel fatty acid | 2.9 | 0.0 | 2.3 | 0.0 |
| Mannanase | 0.0017 | 0.0017 | 0.0017 | 0.0017 |
| Pectawash | 0.00342 | 0.00342 | 0.00342 | 0.00342 |
| Amylase | 0.00766 | 0.00766 | 0.00766 | 0.00766 |
| Protease | 0.07706 | 0.07706 | 0.07706 | 0.07706 |
| Nuclease[3] | 0.010 | 0.01 | 0.01 | 0.01 |
| Sodium tetraborate | 0.0 | 1.7 | 0.0 | 1.7 |
| MEA-Boric Acid Salt | 0.0 | 0.0 | 0.8 | 0.0 |
| Calcium/sodium formate | 0.0 | 0.04 | 0.01 | 0.04 |
| Sodium/Calcium Chloride | 0.04 | 0.02 | 0.03 | 0.02 |
| Ethoxylated polyethyleneimine[2] | 0.0 | 2.0 | 1.1 | 2.0 |
| Amphiphilic graft copolymer | 1.5 | 0.0 | 0.0 | 0.0 |
| Ethoxylated-Propoxylated polyethyleneimine | 0.0 | 2.0 | 0.8 | 2.0 |
| Zwitterionic polyamine | 0.5 | 0.0 | 0.0 | 0.0 |
| Nonionic polyester terephthalate | 1.0 | 1.0 | 1.0 | 1.0 |
| Sulfatized esteramine of the present invention | 1.0 | 2.0 | 1.5 | 2.5 |
| DTPA | 0.0 | 0.1 | 0.2 | 0.1 |
| EDDS | 0.1 | 0.0 | 0.0 | 0.0 |
| GLDA | 0.4 | 0.3 | 0.1 | 0.0 |
| MGDA | 0.2 | 0.0 | 0.0 | 0.5 |
| Diethylene triamine penta(methyl phosphonic) acid (DTPMP) | 1.1 | 0.0 | 0.0 | 0.0 |
| Fluorescent Brightener[8] | 0.06 | 0.22 | 0.03 | 0.15 |
| Ethanol | 0.7 | 1.9 | 0.0 | 1.9 |
| propylene glycol | 5.5 | 5.5 | 0.33 | 5.5 |
| Sorbitol | 0.01 | 0.01 | 0.0 | 0.01 |

TABLE 1-continued

| Raw Material | Comp. 1 % wt | Comp. 2 % wt | Comp. 3 % wt | Comp. 4 % wt |
|---|---|---|---|---|
| Monoethanolamine | 0.2 | 0.2 | 0.6 | 0.2 |
| DETA | 0.1 | 0.08 | 0.0 | 0.08 |
| Antioxidant 1 | 0.0 | 0.1 | 0.1 | 0.1 |
| Antioxidant 2 | 0.1 | 0.0 | 0.0 | 0.0 |
| Hygiene Agent | 0.0 | 0.0 | 0.05 | 0.0 |
| NaOH | 4.7 | 4.7 | 1.1 | 4.7 |
| NaCS | 3.2 | 1.7 | 3.2 | 1.7 |
| Hydrogenated Castor Oil | 0.2 | 0.1 | 0.12 | 0.1 |
| Aesthetic dye | 0.10 | 0.01 | 0.006 | 0.01 |
| Leuco dye | 0.05 | 0.01 | 0.0 | 0.01 |
| Perfume | 2.0 | 1.3 | 0.5 | 1.3 |
| Perfume microcapsules | 0.5 | 0.05 | 0.1 | 0.05 |
| Silicone antifoam[7] | 0.02 | 0.01 | 0.0 | 0.01 |
| Phenyloxyethanol | 0.002 | 0.01 | 0.0 | 0.01 |
| Hueing dye | 0.01 | 0.1 | 0.05 | 0.1 |
| Water & miscellaneous | balance | balance | balance | balance |

[1]C12-15EO2.5S AlkylethoxySulfate where the alkyl portion of AES includes from about 13.9 to 14.6 carbon atoms

[2]PE-20 commercially available from BASF

[3]Nuclease enzyme is as claimed in co-pending European application 19219568.3

4 Antioxidant 1 is 3,5-bis(1,1-dimethylethyl)-4-hydroxybenzenepropanoic acid, methyl ester [6386-38-5]

5 Antioxidant 2 is Tinogard TS commercially available from BASF

6 Hygiene Agent is agent is Tinosan HP 100 commercially available from BASF

[7]Dow Corning supplied antifoam blend 80-92% ethylmethyl, methyl(2-phenyl propyl)siloxane; 5-14% MQ Resin in octyl stearate a 3-7% modified silica.

[8]Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.

Water Soluble Unit Dose Article.

The fabric and home care product can be a water-soluble unit dose article. The water-soluble unit dose article comprises at least one water-soluble film orientated to create at least one unit dose internal compartment, wherein the at least one unit dose internal compartment comprises a detergent composition. The water-soluble film preferably comprises polyvinyl alcohol homopolymer or polyvinyl alcohol copolymer, for example a blend of polyvinylalcohol homopolymers and/or polyvinylalcohol copolymers, for example copolymers selected from sulphonated and carboxylated anionic polyvinylalcohol copolymers especially carboxylated anionic polyvinylalcohol copolymers, for example a blend of a polyvinylalcohol homopolymer and a carboxylated anionic polyvinylalcohol copolymer. In some examples water soluble films are those supplied by Monosol under the trade references M8630, M8900, M8779, M8310. The detergent product comprises a detergent composition, more preferably a laundry detergent composition. Preferably the laundry detergent composition enclosed in the water-soluble unit dose article comprises from between 0.1% and 8%, preferably between 0.5% and 7%, more preferably 1.0% to 6.0% by weight of the detergent composition of the sulfatized esteramine of the present invention. Preferably the soluble unit dose laundry detergent composition comprises a non-soap surfactant, wherein the non-soap surfactant comprises an anionic non-soap surfactant and a non-ionic surfactant. More preferably, the laundry detergent composition comprises between 10% and 60%, or between 20% and 55% by weight of the laundry detergent composition of the non-soap surfactant. The weight ratio of non-soap anionic surfactant to nonionic surfactant preferably is from 1:1 to 20:1, from 1.5:1 to 17.5:1, from 2:1 to 15:1, or from 2.5:1 to 13:1. The non-soap anionic surfactants preferably comprise linear alkylbenzene sulphonate, alkyl sulphate or a mixture thereof. The weight ratio of linear alkylbenzene sulphonate to alkyl sulphate preferably is from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactants comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. Preferably the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. Preferably, the laundry detergent composition comprises between 0.01% and 10%, or between 0.01% and 8%, or between 0.1% and 6%, or between 0.15% and 5% by weight of the liquid laundry detergent composition of a non-ionic surfactant. Preferably, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine preferably monoethanolamine. Preferably the liquid laundry detergent composition comprises less than 15%, or less than 12% by weight of the liquid laundry detergent composition of water. Preferably, the laundry detergent composition comprises between 10% and 40%, or between 15% and 30% by weight of the liquid laundry detergent composition of a non-aqueous solvent selected from 1,2-propanediol, dipropylene glycol, tripropyleneglycol, glycerol, sorbitol, polyethylene glycol or a mixture thereof. Preferably the liquid laundry detergent composition comprises from 0.1% to 10%, preferably from 0.5% to 8% by weight of the detergent composition of further soil release polymers, preferably selected from the group of nonionic and/or anionically modified polyester terephthalate soil release polymers such as commercially available under the Texcare brand name from Clariant, amphiphilic graft polymers such as those based on polyalkylene oxides and vinyl esters, polyalkoxylated polyethyleneimines, and mixtures thereof. Preferably the liquid detergent composition further comprises from 0.1% to 10% preferably from 1% to 5% of a chelant. In some examples, the laundry detergent composition comprises an adjunct ingredient selected from the group comprising builders including citrate, enzymes, bleach, bleach catalyst, dye, hueing dye, brightener, cleaning polymers including (zwitterionic) alkoxylated polyamines, surfactant, solvent, dye transfer inhibitors, perfume, encapsulated perfume, polycarboxylates, structurant, pH trimming agents, and mixtures thereof. Preferably, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian, preferably non-Newtonian.

The following is an exemplary water soluble unit dose formulation. The composition can be part of a single chamber water soluble unit dose article or can be split over multiple compartments resulting in below "averaged across compartments" full article composition. The composition is enclosed within a polyvinyl alcohol based water soluble, the polyvinyl alcohol comprising a blend of a polyvinyl alcohol homopolymer and an anionic e.g. carboxylated polyvinyl alcohol copolymer.

TABLE 2

| Ingredients | Composition 4 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine (Lutensol FP620 - PEI600EO20) | 1.4 |
| Amphiphilic graft copolymer** | 1.6 |
| Zwitterionic polyamine (Lutensit Z96) | 1.5 |
| Anionic polyester terephthalate (Texcare SRA300) | 0.6 |
| Sulfatized esteramine of the present invention | 3.0 |
| HEDP | 2.2 |
| Brightener 49 | 0.4 |
| Silicone anti-foam | 0.3 |
| Hueing dye | 0.05 |
| 1,2 PropaneDiol | 11.0 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |

TABLE 2-continued

| Ingredients | Composition 4 (wt %) |
|---|---|
| $K_2SO_3$ | 0.4 |
| $MgCl_2$ | 0.3 |
| water | 10.5 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

*Nuclease enzyme is as claimed in co-pending European application 19219568.3

**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Hand Dishwashing Liquid Composition.

The fabric and home care product can be a dishwashing detergent composition, such as a hand dishwashing detergent composition, more preferably a liquid hand dishwashing detergent composition. Preferably the liquid hand dishwashing detergent composition comprises from between 0.1% and 5.0%, preferably between 0.5% and 4%, more preferably 1.0% to 3.0% by weight of the detergent composition of the sulfatized esteramine of the present invention. The liquid hand-dishwashing detergent composition preferably is an aqueous composition, comprising from 50% to 90%, preferably from 60% to 75%, by weight of the total composition of water. Preferably the pH of the detergent composition of the invention, measured as a 10% product concentration in demineralized water at 20° C., is adjusted to between 3 and 14, more preferably between 4 and 13, more preferably between 6 and 12 and most preferably between 8 and 10. The composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

The composition comprises from 5% to 50%, preferably from 8% to 45%, more preferably from 15% to 40%, by weight of the total composition of a surfactant system. The surfactant system preferably comprises from 60% to 90%, more preferably from 70% to 80% by weight of the surfactant system of an anionic surfactant. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than 5, preferably less than 3, more preferably from 0.5 to 2.0, most preferably from 0.5 to 0.9. The alkyl sulphate anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company.

The surfactant system preferably comprises from 0.1% to 20%, more preferably from 0.5% to 15% and especially from 2% to 10% by weight of the liquid hand dishwashing detergent composition of a co-surfactant. Preferred co-surfactants are selected from the group consisting of an amphoteric surfactant, a zwitterionic surfactant, and mixtures thereof. The anionic surfactant to the co-surfactant weight ratio can be from 1:1 to 8:1, preferably from 2:1 to 5:1, more preferably from 2.5:1 to 4:1. The co-surfactant is preferably an amphoteric surfactant, more preferably an amine oxide surfactant. Preferably, the amine oxide surfactant is selected from the group consisting of: alkyl dimethyl amine oxide, alkyl amido propyl dimethyl amine oxide, and mixtures thereof, most preferably C12-C14 alkyl dimethyl amine oxide. Suitable zwitterionic surfactants include betaine surfactants, preferably cocamidopropyl betaine.

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of a non-ionic surfactant. Suitable non-ionic surfactants can be selected from the group consisting of: alkoxylated non-ionic surfactant, alkyl polyglucoside ("APG") surfactant, and mixtures thereof. Suitable alkoxylated non-ionic surfactants can be linear or branched, primary or secondary alkyl alkoxylated preferably alkyl ethoxylated non-ionic surfactants comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The liquid hand dishwashing detergent composition herein may optionally comprise a number of other adjunct ingredients such as builders (e.g., preferably citrate), chelants (e.g., preferably GLDA), conditioning polymers, cleaning polymers including polyalkoxylated polyalkylene imines, surface modifying polymers, soil flocculating polymers, sudsing polymers including EO-PO-EO triblock copolymers, grease cleaning amines including cyclic polyamines, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, organic solvents, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

The following is an exemplary liquid hand dishwashing detergent formulation. The formulation can be made through standard mixing of the individual components.

TABLE 3

| As 100% active | Composition 5 (wt %) |
|---|---|
| C1213AE0.6S anionic surfactant (Avg. branching: 37.84%) | 19.6 |
| C1214 dimethyl amine oxide | 6.5 |
| Alcohol ethoxylate nonionic surfactant (Neodol 91/8) | 1.0 |
| Alkoxylated polyethyleneimine (PEI600EO24PO16) | 0.2 |
| Sulfatized esteramine of the present invention | 1.0 |
| Ethanol | 2.4 |
| NaCl | 0.7 |
| Polypropyleneglycol (MW2000) | 0.9 |
| Water + Minor ingredients (perfume, dye, preservatives) | Balance to 100 |
| pH (at 10% product concentration in demineralized water - with NaOH trimming) | 9.0 |

Solid Free-flowing Particulate Laundry Detergent Composition.

The fabric and home care product can be solid free-flowing particulate laundry detergent composition. The following is an exemplary solid free-flowing particulate laundry detergent composition.

TABLE 4

| Ingredient | Composition 6 (wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwitterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Sulfatized esteramine of the present invention | From 0.1 wt % to 4 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |

TABLE 4-continued

| Ingredient | Composition 6 (wt %) |
|---|---|
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminum sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

EXAMPLES

Example 1: Sorbitol, Propoxylated with 96 Mole Propylene Oxide and Ethoxylated with 144 Mole Ethylene Oxide, Esterified with 2 Mole Caprolactam and Sulfatized with 2 Mole Sulfuric Acid 1a Sorbitol, Propoxylated with 18 Mole Propylene Oxide In a 2 l autoclave 248.9 g sorbitol and 6.6 g potassium hydroxide (50% in water) are placed and the mixture is heated to 120° C. Vacuum is applied and the mixture is stirred for 2 hours under vacuum (<10 mbar). The vessel is filled with nitrogen and heated to 140° C. 1400.0 g propylene oxide is added in portions within 40 h. To complete the reaction, the mixture is allowed to post-react for additional 10 h at 140° C. The reaction mixture is stripped with nitrogen and volatile compounds are removed in vacuo at 80° C. After filtration 1635.0 g of a brown oil is obtained (hydroxy value: 262 mgKOH/g).

1b Sorbitol, Propoxylated with 96 Mole Propylene Oxide

In a 2 l autoclave 180.0 g sorbitol, propoxylated with 18 mole propylene oxide and 3.4 g potassium hydroxide (50% in water) are placed and the mixture is heated to 110° C. Vacuum is applied and the mixture is stirred for 2 hours under vacuum (<10 mbar). The vessel is filled with nitrogen and heated to 140° C. 665.9 g propylene oxide is added in portions within 6 h. To complete the reaction, the mixture is allowed to post-react for additional 6 h at 140° C. The reaction mixture is stripped with nitrogen and volatile compounds are removed in vacuo at 80° C. After filtration 836.0 g of a light brown oil is obtained (hydroxy value: 58.5 mgKOH/g).

1c Sorbitol, Propoxylated with 96 Mole Propylene Oxide and Ethoxylated with 144 Mole Ethylene Oxide In a 2 l autoclave 432.7 g sorbitol, propoxylated with 96 mole propylene oxide are placed and the mixture is heated to 60° C. The vessel is purged three times with nitrogen and heated to 140° C. 475.7 g ethylene oxide is added in portions within 4 hours. To complete the reaction, the mixture is allowed to post-react for additional 6 hours at 140° C. The reaction mixture is stripped with nitrogen and volatile compounds are removed in vacuo at 80° C. After filtration 883.0 g of a viscous brown waxy solid is obtained (hydroxy value: 27.8 mgKOH/g).

1d Sorbitol, Propoxylated with 96 Mole Propylene Oxide and Ethoxylated with 144 Mole Ethylene Oxide, Esterified with 2 Mole Caprolactam and Sulfatized with 2 Mole Sulfuric Acid In a 4-neck vessel with thermometer, nitrogen inlet, dropping funnel, reflux condenser and stirrer 157.3 g sorbitol, propoxylated with 96 mole propylene oxide and ethoxylated with 144 mole ethylene oxide (1 c), 3.7 g caprolactam (80% in water), and 1.8 g water are placed. To the mixture 2.7 g sulfuric acid (96%) is added within 10 minutes under a constant stream of nitrogen. Temperature rises up to 55° C. during sulfuric acid addition. The reaction mixture is heated to 135° C. bath temperature and is stirred for 10 hours at 135° C. under reflux. The reflux condenser is removed and under a constant stream of nitrogen, water is distilled off for 3 hours. 160.0 g of a brown solid is obtained. $^1$H-NMR in MeOD indicates 25% conversion of hydroxyl groups into 6-aminohexane acid ester and 33% conversion of hydroxyl groups into sulfuric acid ester.

Example 2: 1,6-Hexane Diol, Esterified with 1 Mole Caprolactam and Esterified with 1 Mole Sulfuric Acid In a 4-neck vessel with thermometer, nitrogen inlet, dropping funnel, reflux condenser and stirrer 23.6 g 1,6-hexane diol, 28.3 g caprolactam (80% in water), and 12.3 g water are placed. To the mixture 20.8 g sulfuric acid (96%) is added within 10 minutes under a constant stream of nitrogen. Temperature rises up to 50° C. during sulfuric acid addition. The reaction mixture is heated to 135° C. bath temperature and is stirred for 3 hours at 135° C. under reflux. The reflux condenser is removed and under a constant stream of nitrogen, water is distilled off for 2 hours. 60.0 g of a brown solid is obtained. $^1$H-NMR in MeOD indicates 45% conversion of hydroxyl groups into 6-aminohexane acid ester and 40% conversion of hydroxyl groups into sulfuric acid ester.

Example 3: 2-Butyl-2-Ethyl-1,3-Propane Diol, Esterified with 1 Mole Caprolactam and Esterified with 1 Mole Sulfuric Acid In a 4-neck vessel with thermometer, nitrogen inlet, dropping funnel, reflux condenser and stirrer 81.5 g molten 2-Butyl-2-ethyl-1,3-propane diol, 72.0 g caprolactam (80% in water), are placed at 30° C. To the mixture 52.4 g sulfuric acid (96%) is added within 10 minutes. Temperature rises up to 65° C. during sulfuric acid addition. The reaction mixture is heated to 135° C. bath temperature and is stirred for 3 hours at 135° C. under reflux. The reflux condenser is removed and under a constant stream of nitrogen, water is distilled off for 2 hours. 180.0 g of a light yellow highly viscous oil is obtained. $^{1}$H-NMR in MeOD indicates 47% conversion of hydroxyl groups into 6-aminohexane acid ester and 35% conversion of hydroxyl groups into sulfuric acid ester.

Example 4: Polyethylene Glycol, Molecular Weight 4000 g/Mol, Esterified with 1 Mole Caprolactam and Esterified with 1 Mole Sulfuric Acid In a 250 ml glass pressure vessel with magnetic stir bar 103.61 g polyethylene glycol molecular weight 4000 g/mol, 3.53 g caprolactam (80% in water), and 7.25 g water are placed. To the mixture 2.60 g sulfuric acid (96%) is added within 10 minutes. Temperature rises up to 50° C. during sulfuric acid addition. The vessel is closed and heated to 148° C. bath temperature and stirred for 6 hours at this temperature. The reaction mixture is transferred to a 4-neck vessel with thermometer, nitrogen inlet, stirrer, and distillation head. Water is distilled off for 27 hours at 5 mbar and 130° C. bath temperature. 108.0 g of a brown solid is obtained. $^{1}$H-NMR in MeOD indicates 50% conversion of hydroxyl groups into 6-aminohexane acid ester and 50% conversion of hydroxyl groups into sulfuric acid ester.

Example 5: Polyethyleneglycol Polypropyleneglycol Block Copolymer Pluronic PE 6400, Esterified with 1 Mole Caprolactam and Esterified with 1 Mole Sulfuric Acid In a 4-neck vessel with thermometer, nitrogen inlet, dropping funnel, reflux condenser and stirrer 101.5 g polyethyleneglycol polypropyleneglycol block copolymer Pluronic PE 6400, 4.95 g caprolactam (80% in water), and 3.15 g water are placed. To the mixture 3.65 g sulfuric acid (96%) is added within 10 minutes. Temperature rises up to 50° C. during sulfuric acid addition. The reaction mixture is heated to 148° C. bath temperature and stirred for 6 hours at this temperature. The reflux condenser is replaced by a distillation head, and water is distilled off for 22 hours under vacuum up to 5 mbar. 107.0 g of a brown solid is obtained. $^{1}$H-NMR in MeOD indicates 45% conversion of hydroxyl groups into 6-aminohexane acid ester and 44% conversion of hydroxyl groups into sulfuric acid ester.

Example 6: Glycerol, Ethoxylated with 12 Mole Ethylene Oxide, Esterified with 1 Mole Caprolactam and Sulfatized with 1 Mole Sulfuric Acid 6a Glycerol, Ethoxylated with 12 Mole Ethylene Oxide In a 2 l autoclave 110.5 g glycerol and 1.5 g potassium tert. butoxide are placed and the mixture is heated to 80° C. The vessel is purged three times with nitrogen and the mixture is heated to 140° C. 634.3 g ethylene oxide is added in portions within 11 hours. To complete the reaction, the mixture is allowed to post-react for additional 5 hours at 140° C. The reaction mixture is stripped with nitrogen and volatile compounds are removed in vacuo at 80° C. After filtration 745.0 g of a brown oil is obtained (hydroxy value: 85.0 mgKOH/g).

6b Glycerol, Ethoxylated with 12 Mole Ethylene Oxide, Esterified with 1 Mole Caprolactam and Sulfatized with 1 Mole Sulfuric Acid In a 4-neck vessel with thermometer, nitrogen inlet, dropping funnel, reflux condenser and stirrer 62.2 g glycerol, ethoxylated with 12 mole ethylene oxide 14.1 g caprolactam (80% in water), and 9.0 g water are placed. To the mixture 10.3 g sulfuric acid (96%) is added within 10 minutes. Temperature rises to 60° C. during sulfuric acid addition. The reaction mixture is heated to 135° C. bath temperature and stirred for 6 hours at this temperature. The reflux condenser is removed and replaced by a distillation head. Water is distilled off for 5 hours under vacuum up to 5 mbar. 80.0 g of a brown solid is obtained. $^{1}$H-NMR in MeOD indicates 32% conversion of hydroxyl groups into 6-aminohexane acid ester and 31% conversion of hydroxyl groups into sulfuric acid ester.

Example 7: Pentaerythritol, Ethoxylated with 16 Mole Ethylene Oxide, Esterified with 1.3 Mole Caprolactam and Sulfatized with 1.3 Mole Sulfuric Acid 7a Pentaerythritol, Ethoxylated with 16 Mole Ethylene Oxide In a 2 l autoclave 130.0 g pentaerythritol and 1.6 g potassium tert. butoxide and 300.0 ml xylene (mixture of isomers) are placed and the mixture is heated to 80° C. The vessel is purged three times with nitrogen and the mixture is heated to 140° C. 673.1 g ethylene oxide is added in portions within 6.5 hours. To complete the reaction, the mixture is allowed to post-react for additional 6 hours at 140° C. The reaction mixture is stripped with nitrogen and solvent xylene is removed in vacuo at 2 mbar at 120° C. After filtration 831.0 g of a yellow oil is obtained (hydroxy value: 271.0 mgKOH/g).

7b Pentaerythritol, Ethoxylated with 16 Mole Ethylene Oxide, Esterified with 1.3 Mole Caprolactam and Sulfatized with 1.3 Mole Sulfuric Acid In a 4-neck vessel with thermometer, nitrogen inlet, dropping funnel, reflux condenser and stirrer 92.7 g pentaerythritol, ethoxylated with 16 mole ethylene oxide, 20.3 g caprolactam (80% in water), and 8.3 g water are placed. To the mixture 14.7 g sulfuric acid (96%) is added within 10 minutes. Temperature rises to 60° C. during sulfuric acid addition. The reaction mixture is heated to 135° C. bath temperature and stirred for 7 hours at this temperature. The reflux condenser is removed and replaced by a distillation head. Water is distilled off for 8 hours at 135° C. bath temperature. Vacuum (5 mbar) is applied, and the mixture is stirred for 5 under vacuum and 135° C. bath temperature. 80.0 g of a brown solid is obtained. $^{1}$H-NMR in MeOD indicates 27% conversion of hydroxyl groups into 6-aminohexane acid ester and 32% conversion of hydroxyl groups into sulfuric acid ester.

Example 8: Sorbitol, Propoxylated with 96 Mole Propylene Oxide and Ethoxylated with 144 Mole Ethylene Oxide, Esterified with 3 Mole Caprolactam and Sulfatized with 3 Mole Sulfuric Acid 8a Sorbitol, Propoxylated with 96 Mole Propylene Oxide and Ethoxylated with 144 Mole Ethylene Oxide In a 3 l autoclave 140.0 g of a sorbitol propoxylate, propoxylated with 6.6 mole propylene oxide (Lupranol 3422, commercially available from BASF SE) and 5.0 g potassium butoxide are placed and the mixture is heated to 60° C. The vessel is purged three times with nitrogen and heated to 140° C. 1060.4 g propylene oxide is added in portions within 6 hours. To complete the reaction, the mixture is allowed to post-react for additional 6 hours at 140° C. 1295.3 g ethylene oxide is added within 6 hours at 140° C., followed by post-reaction time of 6 hours at 140° C. The reaction mixture is stripped with nitrogen and volatile compounds are removed in vacuo at 80° C. After filtration 2490.0 g of a waxy brown solid is obtained (hydroxy value: 33.6 mgKOH/g).

8b Sorbitol, Propoxylated with 96 Mole Propylene Oxide and Ethoxylated with 144 Mole Ethylene Oxide, Esterified with 3 Mole Caprolactam and Sulfatized with 3 Mole Sulfuric Acid In a 4-neck vessel with thermometer, nitrogen inlet, dropping funnel, reflux condenser and stirrer 122.5 g sorbitol, propoxylated with 96 mole propylene oxide and ethoxylated with 144 mole ethylene oxide (8 a), 4.24 g caprolactam (80% in water), and 1.8 g water are placed. To the mixture 3.11 g sulfuric acid (96%) is added within 10 minutes under a constant stream of nitrogen. Temperature rises up to 55° C. during sulfuric acid addition. The reaction mixture is heated to 135° C. bath temperature and is stirred for 7 hours at 135° C. under reflux. The reflux condenser is removed and under a constant stream of nitrogen, water is distilled off for 3 hours. The reaction mixture is stirred at 130° C. for 9 hours under vacuum (<25 mbar). 127.0 g of a brown solid is obtained. $^{1}$H-NMR in MeOD indicates 49% conversion of hydroxyl groups into 6-aminohexane acid ester and 47% conversion of hydroxyl groups into sulfuric acid ester.

Example 9: Sorbitol, Propoxylated with 96 Mole Propylene Oxide and Ethoxylated with 144 Mole Ethylene Oxide, Esterified with 1 Mole Caprolactam and Sulfatized with 1 Mole Sulfuric Acid In a 4-neck vessel with thermometer, nitrogen inlet, dropping funnel, reflux condenser and stirrer 121.13 g sorbitol, propoxylated with 96 mole propylene oxide and ethoxylated with 144 mole ethylene oxide (1 c), 1.41 g caprolactam (80% in water), and 0.09 g water are placed. To the mixture 1.03 g sulfuric acid (96%) is added within 10 minutes under a constant stream of nitrogen. Temperature rises up to 55° C. during sulfuric acid addition. The reaction mixture is heated to 135° C. bath temperature and is stirred for 29 hours at 135° C. under reflux. The reflux condenser is removed and under a constant stream of nitrogen, water is distilled off for 3 hours. The reaction mixture is stirred at 130° C. for 6 hours under vacuum (<25 mbar). 120.0 g of a brown solid is obtained. 1H-NMR in MeOD indicates 15% conversion of hydroxyl groups into 6-aminohexane acid ester and 15% conversion of hydroxyl groups into sulfuric acid ester.

Example 10: Sorbitol, Propoxylated with 6.6 Mole Propylene Oxide and Ethoxylated with 23.4 Mole Ethylene Oxide, Esterified with 3 Mole Caprolactam and Sulfatized with 3 Mole Sulfuric Acid 10a Sorbitol, Propoxylated with 6.6 Mole Propylene Oxide and Ethoxylated with 23.4 Mole Ethylene Oxide In a 2 l autoclave 354.0 g of a sorbitol propoxylate, (Sorbitol propoxylated with 6.6 mole propylene oxide (Lupranol 3422, commercially available from BASF SE)) and 1.8 g potassium butoxide are placed and the mixture is heated to 60° C. The vessel is purged three times with nitrogen and heated to 140° C. 532.3 g ethylene oxide is added in portions within 6 hours. To complete the reaction, the mixture is allowed to post-react for additional 6 hours at 140° C. The reaction mixture is stripped with nitrogen and volatile compounds are removed in vacuo at 110° C. After filtration 874.0 g of a brown oil is obtained (hydroxy value: 199.8 mgKOH/g).

10b Sorbitol, Propoxylated with 6.6 Mole Propylene Oxide and Ethoxylated with 23.4 Mole Ethylene Oxide, Esterified with 3 Mole Caprolactam and Sulfatized with 3 Mole Sulfuric Acid In a 4-neck vessel with thermometer, nitrogen inlet, dropping funnel, reflux condenser and stirrer 68.8 g sorbitol, propoxylated with 6.6 mole propylene oxide and ethoxylated with 23.4 mole ethylene oxide (10 a), 16.9 g caprolactam (80% in water), and 6.5 g water are placed. To the mixture 12.5 g sulfuric acid (96%) is added within 10 minutes under a constant stream of nitrogen. Temperature rises up to 55° C. during sulfuric acid addition. The reaction mixture is heated to 135° C. bath temperature and is stirred for 8 hours at 135° C. under reflux. The reflux condenser is removed and under a constant stream of nitrogen, water is distilled off for 3 hours. The reaction mixture is stirred at 130° C. for 8 hours under vacuum (<25 mbar). 90.0 g of a brown solid is obtained. $^{1}$H-NMR in MeOD indicates 33% conversion of hydroxyl groups into 6-aminohexane acid ester and 41% conversion of hydroxyl groups into sulfuric acid ester.

Example 11: Sorbitol, Propoxylated with 6.6 Mole Propylene Oxide and Ethoxylated with 113.4 Mole Ethylene Oxide, Esterified with 1 Mole Caprolactam and Sulfatized with 1 Mole Sulfuric Acid 11a Sorbitol, Propoxylated with 6.6 Mole Propylene Oxide and Ethoxylated with 113.4 Mole Ethylene Oxide In a 2 l autoclave 300.0 g of a sorbitol alkoxylate (10 a) and 1.4 g potassium butoxide are placed and the mixture is heated to 60° C. The vessel is purged three times with nitrogen and heated to 140° C. 691.6 g ethylene oxide is added in portions within 6 hours. To complete the reaction, the mixture is allowed to post-react for additional 6 hours at 140° C. The reaction mixture is stripped with nitrogen and volatile compounds are removed in vacuo at 80° C. After filtration 990.0 g of a brown oil is obtained (hydroxy value: 64.7 mgKOH/g).

11b Sorbitol, Propoxylated with 6.6 Mole Propylene Oxide and Ethoxylated with 113.4 Mole Ethylene Oxide, Esterified with 1 Mole Caprolactam and Sulfatized with 1 Mole Sulfuric Acid In a 4-neck vessel with thermometer, nitrogen inlet, dropping funnel, reflux condenser and stirrer 85.4 g sorbitol, propoxylated with 6.6 mole propylene oxide and ethoxylated with 113.4 mole ethylene oxide (11 b), 2.1 g caprolactam (80% in water), and 0.9 g water are placed. To the mixture 1.6 g sulfuric acid (96%) is added within 10 minutes under a constant stream of nitrogen. Temperature rises up to 55° C. during sulfuric acid addition. The reaction mixture is heated to 135° C. bath temperature and is stirred for 6 hours at 135° C. under reflux. The reflux condenser is removed and under a constant stream of nitrogen, water is distilled off for 3 hours. The reaction mixture is stirred at 130° C. for 8 hours under vacuum (<25 mbar). 85.0 g of a brown solid is obtained. $^{1}$H-NMR in MeOD indicates 15% conversion of hydroxyl groups into 6-aminohexane acid ester and 15% conversion of hydroxyl groups into sulfuric acid ester.

Example 12: Sorbitol, Propoxylated with 6.6 Mole Propylene Oxide and Ethoxylated with 113.4 Mole Ethylene Oxide, Esterified with 3 Mole Caprolactam and Sulfatized with 3 Mole Sulfuric Acid In a 4-neck vessel with thermometer, nitrogen inlet, dropping funnel, reflux condenser and stirrer 85.4 g sorbitol, propoxylated with 6.6 mole propylene oxide and ethoxylated with 113.4 mole ethylene oxide (11 a), 6.3 g caprolactam (80% in water), and 0.9 g water are placed. To the mixture 4.7 g sulfuric acid (96%) is added within 10 minutes under a constant stream of nitrogen. Temperature rises up to 55° C. during sulfuric acid addition. The reaction mixture is heated to 135° C. bath temperature and is stirred for 8 hours at 135° C. under reflux. The reflux condenser is removed and under a constant stream of nitrogen, water is distilled off for 3 hours. The reaction mixture is stirred at 130° C. for 7 hours under vacuum (<25 mbar). 89.0 g of a brown solid is obtained. $^{1}$H-NMR in MeOD indicates 40% conversion of hydroxyl groups into 6-aminohexane acid ester and 42% conversion of hydroxyl groups into sulfuric acid ester.

Method for Evaluating Suds Mileage of Hand Dish Composition

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1) A defined amount of a test composition, depending on the targeted composition concentration (0.12 wt %), is dispensed through a plastic pipette at a flow rate of 0.67 mL/sec at a height of 37 cm above the bottom surface of a sink (dimension: 300 mm diameter and 288 mm height) into a water stream (water hardness: 15 gpg, water temperature: 35° C.) that is filling up the sink to 4 L with a constant pressure of 4 bar.
2) An initial suds volume generated (measured as average foam height×sink surface area and expressed in $cm^3$) is recorded immediately after end of filling.
3) A fixed amount (6 mL) of soil is immediately injected into the middle of the sink.
4) The resultant solution is mixed with a metal blade (10 cm×5 cm) positioned in the middle of the sink at the air liquid interface under an angle of 45 degrees rotating at 85 RPM for 20 revolutions.
5) Another measurement of the total suds volume is recorded immediately after end of blade rotation.
6) Steps 3-5 are repeated until the measured total suds volume reaches a minimum level of 400 $cm^3$. The amount of added soil that is needed to get to the 400 $cm^3$ level is considered as the suds mileage for the test composition.
7) Each test composition is tested 4 times per testing condition (i.e., water temperature, composition concentration, water hardness, soil type).
8) The average suds mileage is calculated as the average of the 4 replicates for each sample.
9) Calculate a Suds Mileage Index by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

Soil composition is produced through standard mixing of the components described in Table 5.

TABLE 5

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

Method for Evaluating Whiteness Benefit of Polymers

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed.

The whiteness benefit of polymers of the present disclosure is evaluated using automatic Tergotometer with 10 pots for laundry formulation testing.

SBL2004 test soil strips supplied by WFK Testgewebe GmbH are used to simulate consumer soil levels (mix of body soil, food, dirt, grass etc.). On average, every 1 SBL2004 strip is loaded with 8 g soil. The SBL2004 test soil strips were cut into 5×5 cm squares for use in the test.

White Fabric swatches of Table 6 below purchased from WFK Testgewebe GmbH are used as whiteness tracers. Before wash test, L, a, b values of all whiteness tracers are measured using Konica Minolta CM-3610D spectrophotometer.

TABLE 6

| Code | Fiber Content | % Fiber Content | Fabric Construction | Size | WFK Code |
|---|---|---|---|---|---|
| CK | Cotton | 100 | Weft Knit | (5 × 5 cm) | 19502_5x5_stamped |
| PC | Polyester/cotton | 65/35 | Weave | (5 × 5 cm) | 19503_5x5_stamped |

TABLE 6-continued

| Code | Fiber Content | % Fiber Content | Fabric Construction | Size | WFK Code |
|---|---|---|---|---|---|
| PE | Polyester | 100 | Weft Knit | (5 × 5 cm) | 19508_5x5_stamped |
| PS | Polyester/Spandex | 95/5 | Weft Knit | (5 × 5 cm) | 19507_5x5_stamped |

Additional ballast (background fabric swatches) are also used to simulate a fabric load and provide mechanical energy during the real laundry process. Ballast loads are comprised of cotton and polycotton knit swatches at 5×5 cm size.

4 Cycles of Wash are Needed to Complete the Test:

Cycle 1: Desired amount of detergent is fully dissolved by mixing with 1 L water (at defined hardness) in each tergotometer port. 60 grams of fabrics, including whiteness tracers (4 types, each with 4 replicates), 21 pieces 5×5 cm SBL2004, and ballast are washed and rinsed in the tergotometer pot under defined conditions.

In the test of water-soluble unit dose composition, wash concentration is 2000 ppm. Additional 47 ppm PVOH film is also added to the tergotometer pot. The wash temperature is 30° C., water hardness is 20 gpg.

Cycle 2: The whiteness tracers and ballast from each pot are then washed and rinsed again together with a new set of SBL2004 (5×5 cm, 21 pieces) follow the process of cycle 1. All other conditions remain same as cycle 1.

Cycle 3: The whiteness tracers and ballast from each pot are then washed and rinsed again together with a new set of SBL2004 (5×5 cm, 21 pieces) follow the process of cycle 1. All other conditions remain same as cycle 1.

Cycle 4: The whiteness tracers and ballast from each port are then washed and rinsed again together with a new set of SBL2004 (5×5 cm, 21 pieces) follow the process of cycle 1. All other conditions remain same as cycle 1.

After Cycle 4, all whiteness tracers & ballast are tumbled dried between 60-65° C. until dry, the tracers are then measured again using Konica Minolta CM-3610D spectrophotometer. The changes in Whiteness Index (ΔWI(CIE)) are calculated based on L, a, b measure before and after wash.

$$\Delta WI(CIE)\text{-}WI(CIE)(\text{after wash})-WI(CIE)(\text{before wash}).$$

Method for Evaluating Cleaning Benefit of Polymers

Cleaning benefit of polymers are evaluated using tergotometer. Some example test stains suitable for this test are:

Standard Grass ex Equest
Standard Black Todd Clay ex Equest
ASTM Dust Sebum ex CFT
Highly Discriminating Sebum on polycotton ex CFT
Burnt Butter on Knitted cotton ex Equest
Dyed Bacon on Knitted Cotton ex Equest The stains are analyzed using commercially available image analysis system for L, a, b values.

Inventive polymer is typically formulated into a finished product together with other ingredients for test. Wash solution is prepared by diluting test product with water (at defined hardness) to a defined wash concentration.

In the test of water-soluble unit dose composition, additional 47 ppm PVOH film is also added to the tergotometer pot. The wash temperature is 30° C., and water hardness is 8 gpg.

The fabrics to be washed in each tergotometer pot include 2 pieces of each test stain (2 internal replicates), 13 swatches of 5×5 cm WfK SBL 2004 soil sheets, and additional knitted cotton ballast to make the total fabric weight up to 60 g.

Once all the fabrics are added into tergotometer pot containing wash solution, the wash solution is agitated for 40 minutes. The wash solutions are then drained, and the fabrics are subject to 5 minute rinse steps once or twice before being drained and spun dry. The washed stains are dried in an airflow cabinet, then analyzed using commercially available image analysis system for L, a, b values.

This procedure is repeated further to give a total of 3-4 external replicates.

Stain Removal Index (SRI) are calculated from the L, a, b values using the formula shown below. The higher the SRI, the better the stain removal.

$$SRI=100*((\Delta E_b-\Delta E_a)/\Delta E_b)$$

$$\Delta E_b=\sqrt{((L_c-L_b)^2+(a_c-a_b)^2+(b_c-b_b)^2)}$$

$$\Delta E_a=\sqrt{((L_c-L_a)^2+(a_c-a_a)^2+(b_c-b_a)^2)}$$

Subscript ‘b’ denotes data for the stain before washing
Subscript ‘a’ denotes data for the stain after washing
Subscript ‘c’ denotes data for the unstained fabric Polymer Performance in Hand Dish Detergent Hand dish detergent composition below are prepared by traditional means known to those of ordinary skill in the art by mixing the listed ingredients. The impact of inventive polymers on suds mileage are evaluated by using the method for evaluating suds mileage of hand dish compositions described herein. As indicated in Table 7, inventive polymers 8, 11 and 12 deliver a clear suds mileage benefit.

TABLE 7

| Ingredient | A (Ref) | B | C | D |
|---|---|---|---|---|
| | % by weight of the composition | | | |
| NaCl | 0.9 | 0.9 | 0.9 | 0.9 |
| Polypropylene glycol (mw 2000) | 0.809 | 0.809 | 0.809 | 0.809 |
| Ethanol | 1.7 | 1.7 | 1.7 | 1.7 |
| Alkoxylated polyethyleneimine** | 0.432 | 0.432 | 0.432 | 0.432 |
| Magnesium sulfate heptahydrate | 0.04286 | 0.04286 | 0.04286 | 0.04286 |
| C12-13 AE0.6S anionic surfactant | 22.86 | 22.86 | 22.86 | 22.86 |
| C12-14 dimethyl amine oxide | 2.39 | 2.39 | 2.39 | 2.39 |
| BIT | 0.0045 | 0.0045 | 0.0045 | 0.0045 |
| Phenoxyethanol | 0.08 | 0.08 | 0.08 | 0.08 |

TABLE 7-continued

| Ingredient | A (Ref) | B | C | D |
|---|---|---|---|---|
| | % by weight of the composition | | | |
| NaOH | 0.24 | 0.24 | 0.24 | 0.24 |
| Perfume | 0.195 | 0.195 | 0.195 | 0.195 |
| Yellow Dye | 0.004 | 0.004 | 0.004 | 0.004 |
| Blue Dye | 0.00165 | 0.00165 | 0.00165 | 0.00165 |
| Polymer Example 8 | — | 1 | — | — |
| Polymer Example 11 | — | — | 1 | — |
| Polymer Example 12 | — | — | — | 1 |
| Water | Balance | Balance | Balance | Balance |
| pH (as 10 w/v % product concentration in water) | 9.0 | 9.0 | 9.0 | 9.0 |
| Suds mileage index | 100 | 110 | 104 | 106 |

*amphiphilic alkoxylated polyethyleneimine (total MW: about 28000 g/mol) with a polyethyleneimine backbone of MW 600 and alkoxylation chains each chain comprising 24 internal EO units and 16 terminal PO units.

Polymer Whiteness and Cleaning Performance in Liquid Detergent

Water soluble unit dose detergent composition E and F below are prepared by traditional means known to those of ordinary skill in the art by mixing the listed ingredients.

The whiteness maintenance of the inventive polymer has been evaluated according to the method for evaluating whiteness performance of polymers by directly comparing the whiteness performance and cleaning performance of Comparative formula E and Inventive formula F. As shown in the following table, the inventive polymer delivers significant whiteness benefit (especially on synthetic fabric) and significant sebum removal benefit.

TABLE 8

| Ingredients | E (Comparative) | F (Inventive) |
|---|---|---|
| LAS (wt %) | 23.29 | 23.29 |
| AES (wt %) | 11.99 | 11.99 |
| AE NI (wt %) | 1.92 | 1.92 |
| Suds Suppressor (wt %) | 0.25 | 0.25 |
| Polymer Example 8 (wt %) | 0.00 | 5.53 |
| DTPA (wt %) | 0.49 | 0.49 |
| HEDP (wt %) | 2.12 | 2.12 |
| Monoethanolamine (wt %) | 7.68 | 7.68 |
| 1,2 PropaneDiol (wt %) | 8.52 | 8.52 |
| DiPropyleneGlycol (wt %) | 1.53 | 1.53 |
| Sodium Bisulphite (wt %) | 0.17 | 0.17 |
| $KSO_3$ (wt %) | 0.37 | 0.37 |
| $MgCl_2$ (wt %) | 0.30 | 0.30 |
| Citric Acid (wt %) | 0.66 | 0.66 |
| Fatty Acid (wt %) | 1.53 | 1.53 |
| Glycerine (wt %) | 4.49 | 4.49 |
| Brightener (wt %) | 0.37 | 0.37 |
| Blue dye (wt %) | 0.0059 | 0.0059 |
| Enzyme (including Protease, Amylase, and Mannanase) (wt %) | 0.0657 | 0.0657 |
| Preservative (wt %) | 0.009 | 0.009 |
| Hydrogenated castor oil (wt %) | 0.09 | 0.09 |
| Perfume (wt %) | 2.17 | 2.17 |
| Hueing Dye (wt %) | 0.053 | 0.053 |
| Water/minors (wt %) | Balance | Balance |
| ΔWI(CIE) vs Reference (on PE: 100% Polyester Knit) | Reference | +3.4s |
| ΔSRI vs Reference (Highly Discriminating Sebum on polycotton) | Reference | +3.7s |

s: data are statistically significant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric and home care product comprising a surfactant system and a sulfatized esteramine obtainable by a process comprising step a):

a) reacting at least one compound (A) comprising an alcohol containing at least two hydroxy groups, compound B comprising at least one lactam; and compound (C) comprising sulfuric acid;

wherein the sulfatized esteramine has a structure according to Formula (I) and salts thereof, (Formula I)

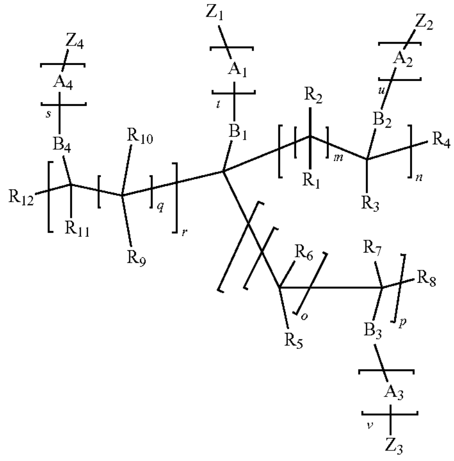

wherein independently from each other n being an integer from about 1 to about 12, m being an integer for each repetition unit n independently selected from about 0 to about 12;

p being an integer from about 0 to about 12, o being an integer for each repetition unit p independently selected from about 0 to about 12;

r being an integer from about 0 to about 12, q being an integer for each repetition unit r independently selected from about 0 to about 12;

s, t, u and v being an integer from about 0 to about 100;

$A_1$, $A_2$, $A_3$, and $A_4$ are independently from each other and independently for each repetition unit s, t, u, or v, selected from the list consisting of alkyleneoxy group, such A-units stem from the reaction of one alcohol with at least two hydroxy groups with $C_2$-$C_{22}$ alkylene oxides, wherein for s, t, u, and/or v equal to 1 the oxygen atom of the $A_1$, $A_2$, $A_3$, and $A_4$ group is bound to the B group and the following $A_1$, $A_2$, $A_3$, and $A_4$ groups are always bound via the oxygen atom to the previous $A_1$, $A_2$, $A_3$, and $A_4$ group, $B_1$, $B_2$, $B_3$, and $B_4$ are independently from each other selected from the group consisting of a bond, linear $C_1$ to $C_{12}$ alkanediyl groups, and branched $C_1$ to $C_{12}$ alkanediyl groups, such B-units are given by the molecular structure of one alcohol with at least two hydroxy groups, $R_1$, $R_2$, $R_3$ $R_4$, $R_5$, $R_6$, $R_7$, $R_8$, $R_9$, $R_{10}$, $R_{11}$ and $R_{12}$ being independently for each repetition unit selected from the group consisting of H, linear alkyl, branched alkyl, and cycloalkyl; such R-units are given by the molecular structure of one alcohol with at least two hydroxy groups, $Z_1$, and/or $Z_2$, and/or $Z_3$, and/or $Z_4$, independently for each repetition unit n, p, and r, are selected from the group consisting of OH, and $OSO_3^-$, and —$OSO_3H$ and a compound according to Formula (II), wherein said compound according to Formula (II) connects to the compound according to Formula (I) via the bond labeled with *, such Z-units stem from the reaction of one alcohol with at least two hydroxy groups with at least one lactam and with sulfuric acid, with the proviso that at least about 10 mol % to about 50 mol % of the substituents $Z_1$, and/or $Z_2$, and/or $Z_3$, and/or $Z_4$, are a compound according to Formula (II), and at least about 10 mol % to about 50 mol % of the substituents $Z_1$, and/or $Z_2$, and/or $Z_3$, and/or $Z_4$, are a group consisting of $OSO_3^-$, or —$OSO_3H$, and about 0 mol % to about 80 mol % of the substituents $Z_1$, and/or $Z_2$, and/or $Z_3$, and/or $Z_4$, are OH, (Formula II)

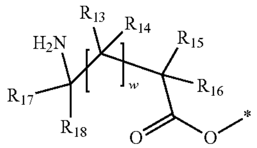

with independently from each other w being an integer from about 0 to about 12, $R_{13}$, $R_{14}$ $R_{15}$, $R_{16}$, $R_{17}$, and $R_{18}$ independently being selected from the group consisting of H, linear alkyl, branched alkyl, and cycloalkyl; such R-units stem from the lactam.

2. The fabric and home care product according to claim 1, wherein the product comprises from about 1% to about 70%, by weight of the product, of the surfactant system.

3. The fabric and home care product according to claim 1, wherein the surfactant system is selected from the group consisting of anionic surfactants, nonionic surfactants, cationic surfactants, zwitterionic surfactants, amphoteric surfactants, and mixtures thereof.

4. The fabric and home care product according to claim 1, wherein the product comprises from about 0.1% to about 5%, by weight of the product, of the sulfatized esteramine.

5. The fabric and home care product according to claim 1, wherein the product is a laundry detergent composition or a dishwashing detergent composition.

* * * * *